UNITED STATES PATENT OFFICE.

BERTHOLD SINGER, OF CHICAGO, ILLINOIS, ASSIGNOR TO THE PEROLIN COMPANY OF AMERICA, OF CHICAGO, ILLINOIS, A CORPORATION OF ILLINOIS.

PROCESS FOR THE MANUFACTURE OF SWEEPING COMPOUNDS.

No. 854,114.　　　　Specification of Letters Patent.　　　　Patented May 21, 1907.

Application filed June 28, 1906. Serial No. 323,930.

*To all whom it may concern:*

Be it known that I, BERTHOLD SINGER, a citizen of the United States, residing at Chicago, in the county of Cook and State of Illinois, have invented a certain new and useful Process for the Manufacture of Sweeping Compounds, of which the following is a full, clear, and exact specification.

This invention relates to a process for the manufacture of compositions of matter designed to be placed upon the floor preparatory to and during sweeping for collecting or laying the dust, and it has for its primary object to provide an improved and efficient method or process for the production of a granular form of material for the described purpose, in which each individual granule or particle shall contain within itself a quantity of moist dust absorbing or collecting substance entirely free from oil or other like ingredient liable to damage the surfaces with which it comes into contact, and which dust-collecting substance shall be so held by the said particles and combined therewith as to remain moist practically indefinitely.

With a view to the attainment of these ends, and the accomplishment of certain other objects which will hereinafter appear, the invention consists in the features of novelty which will now be more specifically described, and particularly pointed out in the claims.

In carrying out my invention, I employ a suitable body material comprising small particles or granules, each individual granule of which possesses pores, so as to be capable of absorbing a liquid, as contradistinguished from merely carrying a portion of the liquid on its exterior, and these particles or granules I thoroughly impregnate or saturate with saponified water in proportion sufficient to fully laden each particle without having any free liquid, so that the resultant product will be a granular mass, or mass of detached, separated particles, each containing within itself a quantity of the saponified liquid, and being capable of rolling freely upon the floor, or other surface, and bringing all of its sides into contact with the dust particles, which adhere to the saponified granules by reason of their moist surfaces, which are retained in this moist condition practically indefinitely, and the moisture of the surface thereof replenished by the more liquid form of the saponified substance contained further within the pores of the granule or body-particle.

As a suitable porous granular, or comminuted body-substance, I employ saw-dust, comminuted slag, or other like material, but preferably saw-dust, because of its cheapness, its porous nature, and its cleaning properties; and for the saponified material, I employ any suitable soap and water, but preferably a potash or soda soap, and one containing fatty substances, and ammonia. To about one pound of soap, I add from ten to twenty-five pounds of water, in which the soap is dissolved by the aid of heat, preferably by steam introduced directly into the solution, and after the soap is thoroughly dissolved, making a saponified liquid, and while it is still at a high degree of heat, I add thereto about twelve pounds of saw-dust, or sufficient to entirely absorb all of the liquid and at the same time thoroughly saturate all particles of the saw-dust without leaving the mass mushy or wet. These proportions will vary somewhat according to the amount of moisture indigenous to the sawdust and to the character of the soap ingredients, the soaps containing an abundance of fat requiring more water than those containing less fat. The saw-dust being introduced while the liquid is hot, it readily receives the liquid into its pores, and when it is allowed to cool, the liquid assumes a jelly-like form, which is more or less firm on the outside but of a more liquid consistency further within the pores, so that the exterior portion continually draws moisture from the interior in sufficient quantity to keep the exterior in that semi-moist condition necessary for collecting or laying the particles of dust with which it comes in contact during the sweeping operation.

A sweeping compound composed of these ingredients will not only lay or collect the dust without staining or greasing the floor or carpet, but will also cleanse any surface upon which it is rubbed.

The efficiency of the material thus described may be considerably enhanced by the addition thereto of a quantity of sand, which serves the two-fold purpose of cutting the particles of saw-dust apart, avoiding the possibility of the granules hanging together *en masse*, and adding weight to the mass to prevent it from flying too freely under the action of the broom, to say nothing of the scouring properties of sand itself. With the proportions before mentioned, thirty pounds of sand may be employed.

The compound may be still further improved by the addition of common salt, or sodium chlorid, in a granular state, which possesses cleaning properties in itself, and has the further advantage of being hygroscopic, and attracting moisture to the mass, as well as drawing the moisture from the interior of the particles of saw-dust to their exteriors and thereby keeping the exteriors moist to the requisite degree.

The product or composition of matter described herein is not herein claimed, inasmuch as it constitutes the subject-matter of the claims of my co-pending application.

I claim:

1. The herein described method for the manufacture of a sweeping compound, which consists in producing a saponified solution and introducing thereinto a quantity of absorbent granules until all of the free liquid is absorbed.

2. The herein described process of manufacturing a sweeping compound, which consists in producing a hot solution of soap and water, and introducing thereinto while hot a quantity of absorbent granules sufficient to absorb all of the liquid.

3. The herein described process of manufacturing a sweeping compound, which consists in producing a saponified solution, injecting steam into the same, and introducing into the solution while hot a sufficient quantity of saw-dust to absorb the free liquid.

4. A process of manufacturing a granular sweeping preparation which consists in producing a hot soap solution of such strength as to assume a jelly like form when allowed to cool and introducing therein absorbent granules in such proportion as to wholly absorb the said solution.

5. A process of manufacturing a granular sweeping preparation which consists in dissolving soap in water in such proportions that the resulting solution is in a liquid state when hot and in a jelly like state when cool and introducing into said solution while hot porous granular material in such proportions that the liquid will not only be wholly taken up by the said material, but the granules themselves will remain free from a sapotaceous coating adapted to cause the said granules to adhere to each other.

In testimony whereof I affix my signature in the presence of two witnesses.

BERTHOLD SINGER.

Witnesses:
   W. WALDMAN,
   C. HEYMANN.